Figure 1:
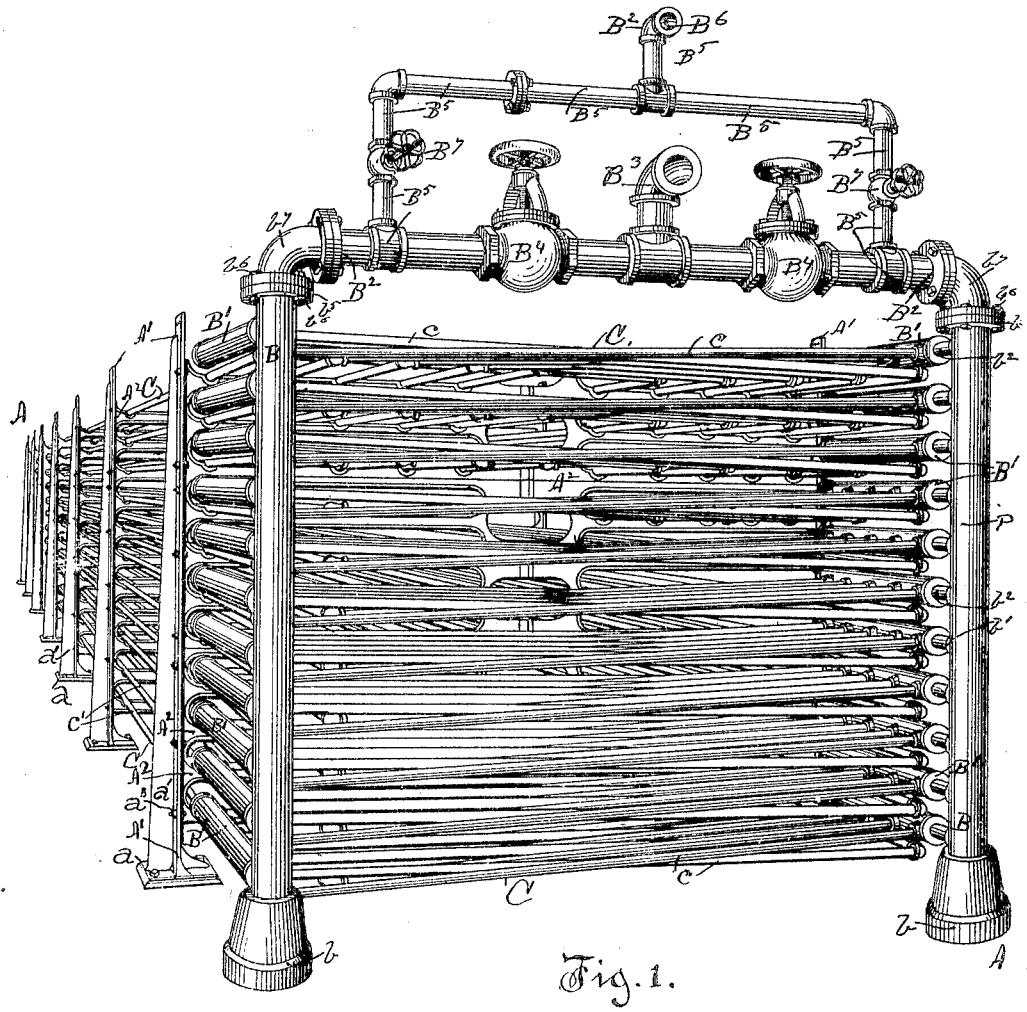

No. 804,489. PATENTED NOV. 14, 1905.
W. R. MARTIN.
BRICK DRIER.
APPLICATION FILED JUNE 16, 1905.

6 SHEETS—SHEET 1.

Witnesses:
Mabel L. Lefevre.
Fred P. Mentzer.

Inventor.
William R. Martin
By Dan'l H. Herr.
Attorney.

No. 804,489. PATENTED NOV. 14, 1905.
W. R. MARTIN.
BRICK DRIER.
APPLICATION FILED JUNE 16, 1905.
6 SHEETS—SHEET 6.
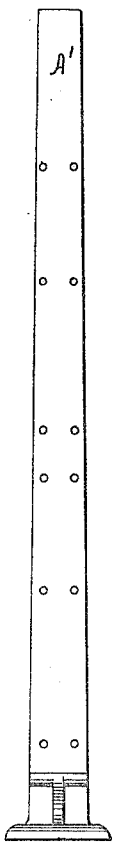
Fig. 6.
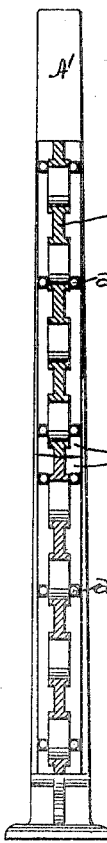
Fig. 7.
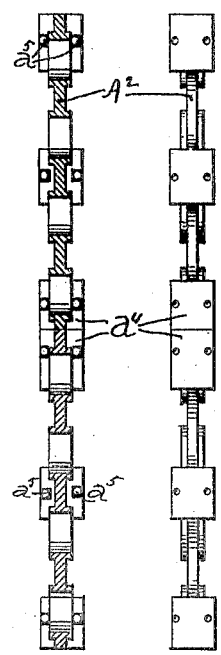
Fig. 7.ᵃ  Fig. 9.ᵃ  Fig. 9.ᵇ
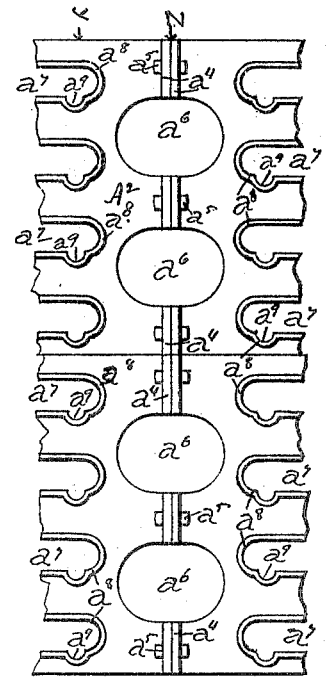
Fig. 9.
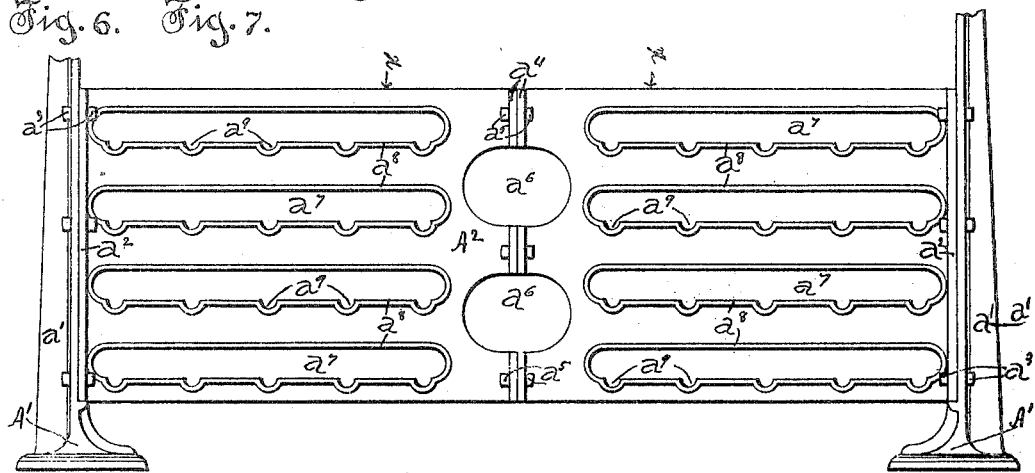
Fig. 8.
Witnesses:
Mabel S. Lefevre.
Cond. P. Mintzer.
Inventor.
William R. Martin.
By Frank H. Herr.
Attorney.

UNITED STATES PATENT OFFICE.

WILLIAM RICHARD MARTIN, OF WEST HEMPFIELD TOWNSHIP, LANCASTER COUNTY, PENNSYLVANIA.

BRICK-DRIER.

No. 804,489.  Specification of Letters Patent.  Patented Nov. 14, 1905.

Application filed June 16, 1905. Serial No. 265,605.

*To all whom it may concern:*

Be it known that I, WILLIAM RICHARD MARTIN, a citizen of the United States, residing at the Hedges, West Hempfield township, in the county of Lancaster and State of Pennsylvania, have invented new and useful Improvements in Brick-Driers with Metallic Supporting-Frames, of which the following is a specification.

This invention relates to improvements in a drier of that class in which a specially-constructed frame supports a series of pipes arranged in layers and tiers, constituting the shelves on which are placed pallets or metallic plates supporting the substances or parcels to be dried, in which live or exhaust steam is used to supply the required heat, and in which provision is made to compensate for the expansion and contraction resulting from the steam introduced into the pipes and its condensation therein.

The object of the invention is the construction of a drier especially adapted to be used in brick-yards where large numbers of bricks are formed or molded by machinery and in which green bricks are placed and properly cured or dried whatever may be the weather conditions.

The elements of the invention will severally and at large appear in the following description, and they will be separately or combinedly set forth or pointed out in the appended claim or claims.

The purposes of the invention are attained by the mechanism, devices, and means illustrated in the accompanying drawings, with similar reference characters to designate like parts throughout the several views, in which—

Figure 2:
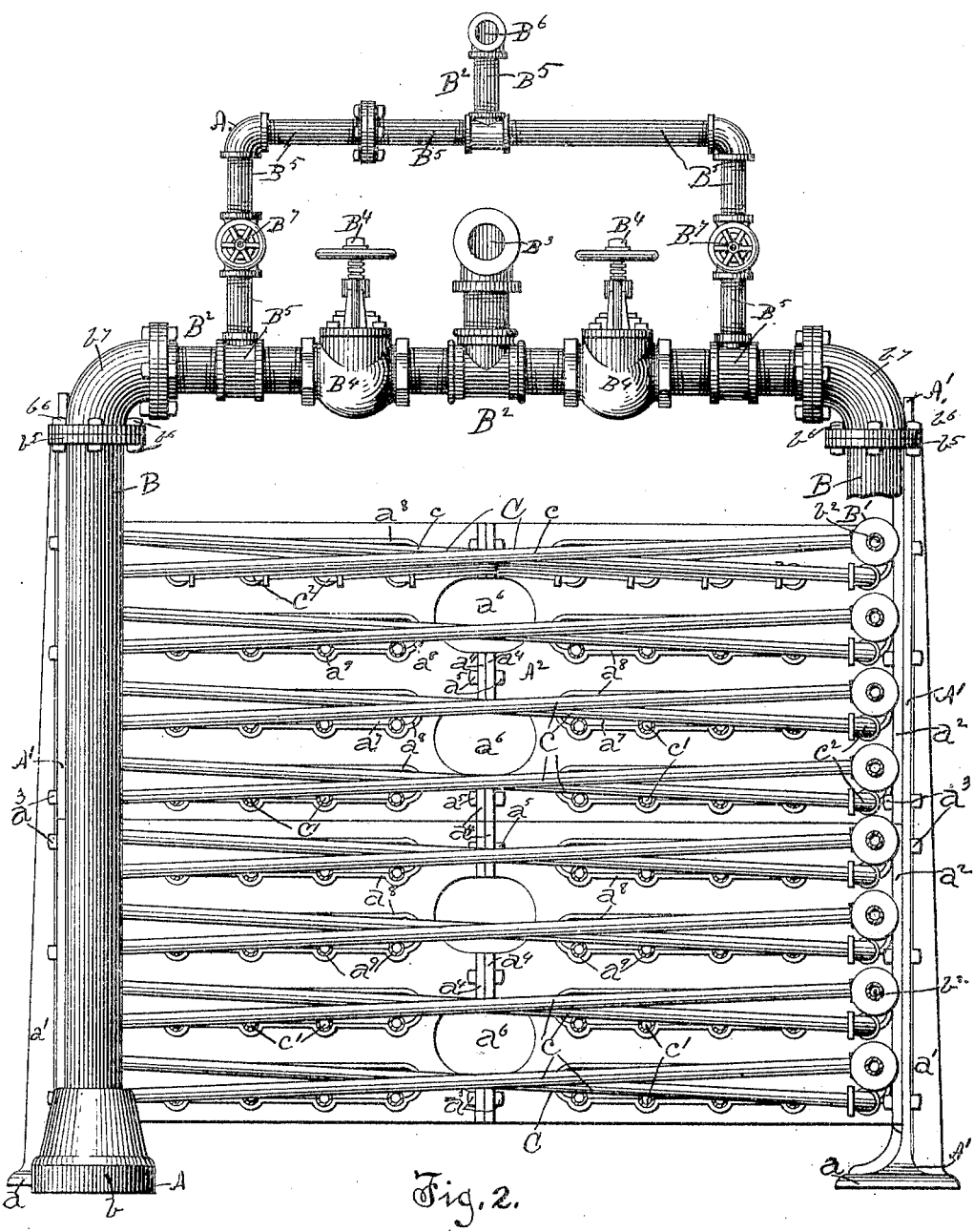
Figure 3:
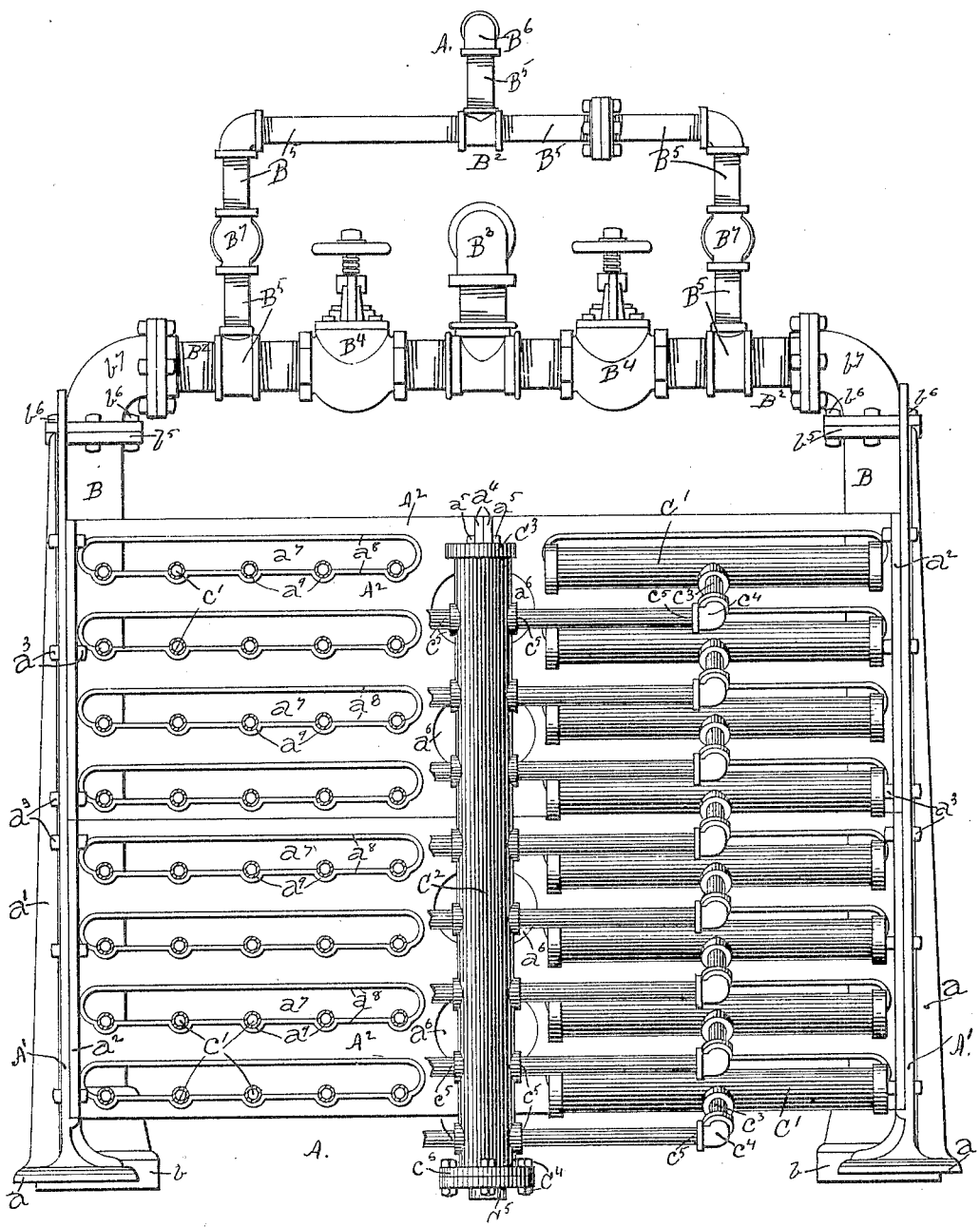
Figure 4:
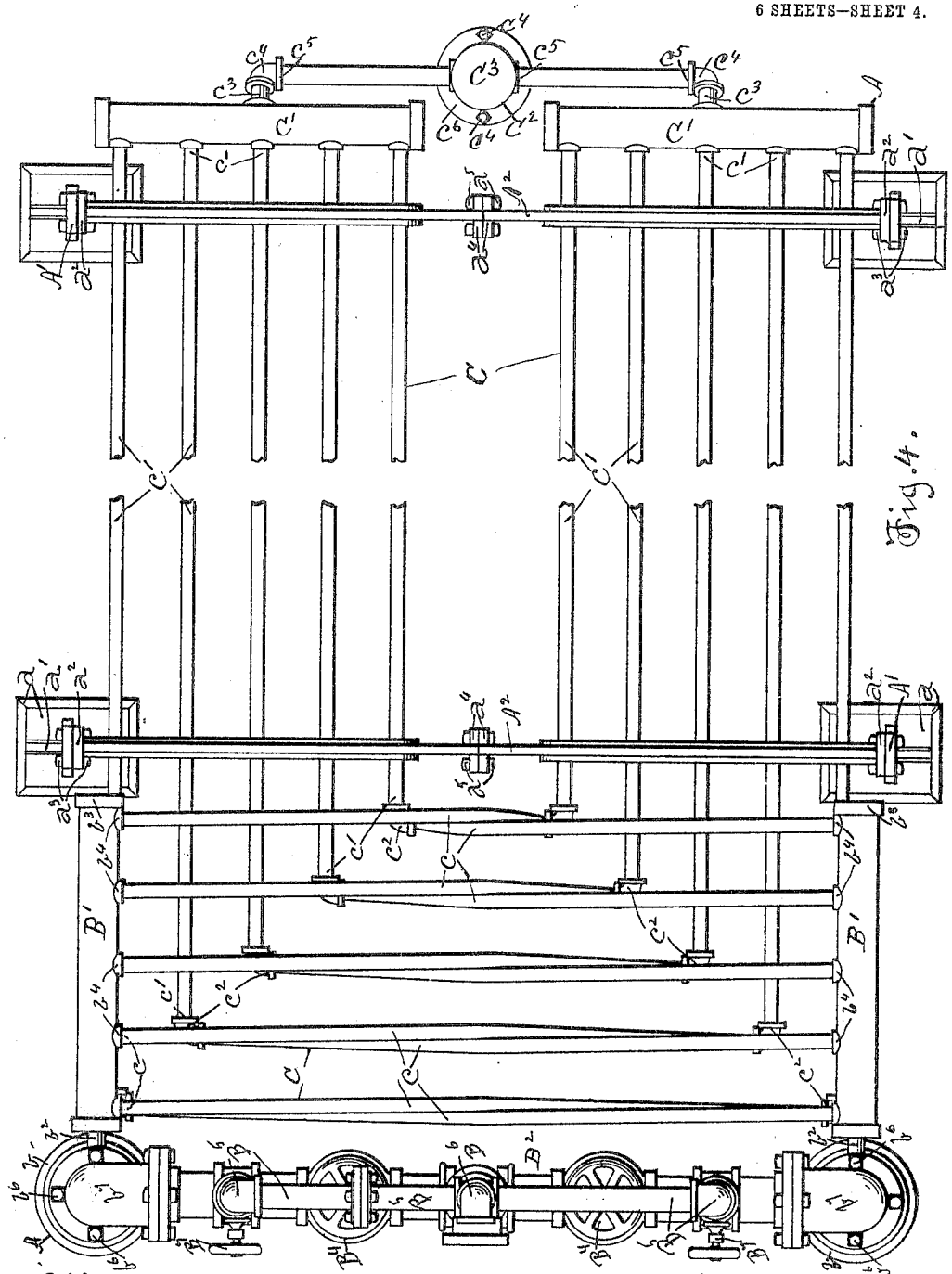
Figure 5:
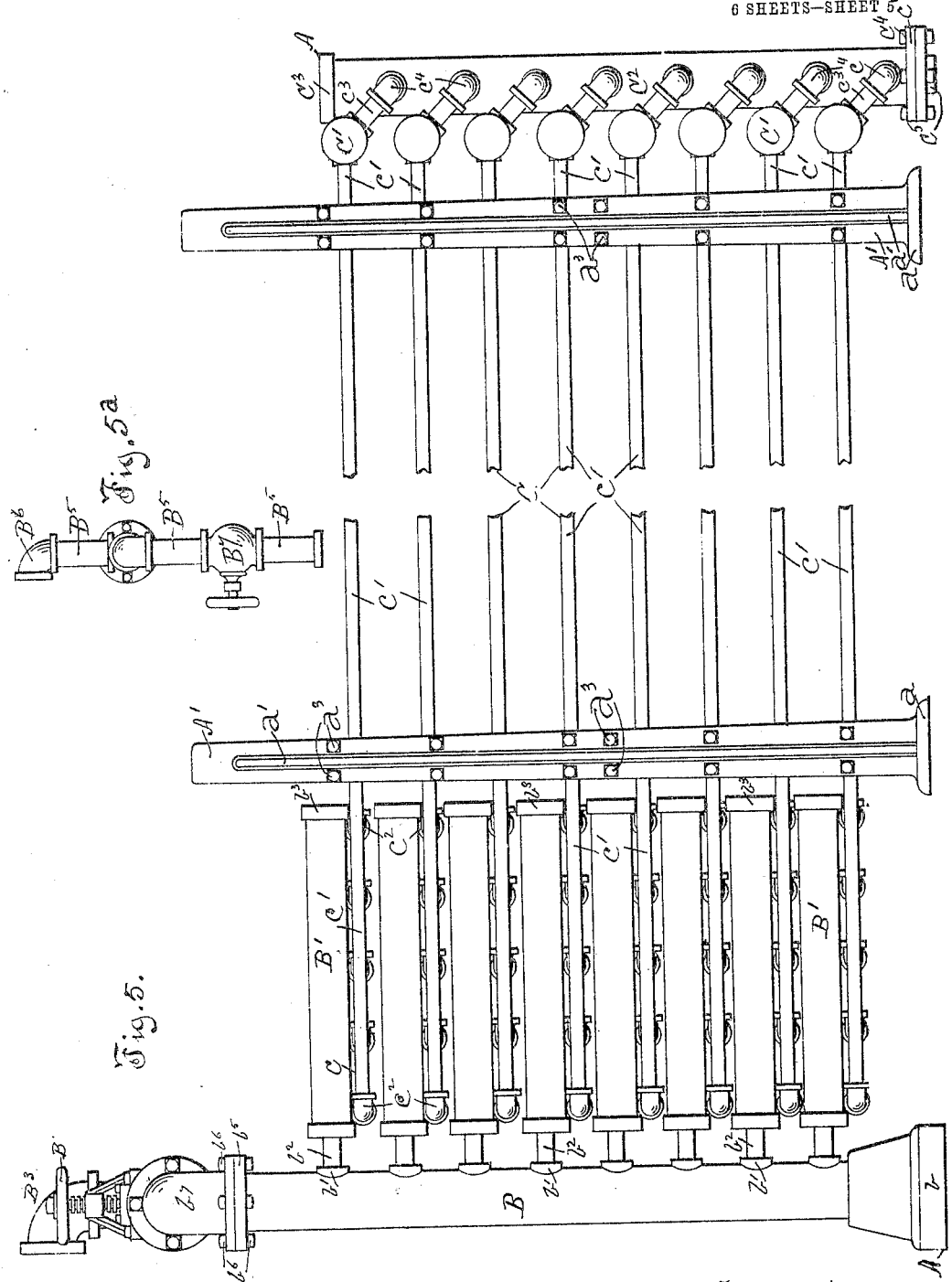

Figure 1 is a perspective view, taken from the head end, of a drier referred to in the opening paragraph hereto, showing means whereby live and exhaust steam are inducted thereinto. Fig. 2 is a head end elevation of the drier with the lower portion of the right-hand manifold removed. Fig. 3 is a rear end elevation of the same with portions from the left-hand side removed. Fig. 4 is a top or plan view of the same with the central portion of the pipes between the front and rear end posts removed. Fig. 5 is a side elevation of Fig. 4 as it appears when viewed from the right with the live steam-induction tubes removed. Fig. 5$^a$ is a side elevation of the live-steam-induction tubes removed from Fig. 5, as they appear when viewed from the right. Fig. 6 is a detached elevation of a left end post as it appears when viewed from the right. Fig. 7 is a similar elevation of the same post, showing sections of the bracket-plates secured in position thereon, the sections being taken through vertical center lines of the pipe-orifices. Fig. 7$^a$ is a detached and rear side elevation of the bracket-plates, showing the joint-surfaces thereof. Fig. 8 is a side elevation of the lower portions of right and left hand end posts with the lower bracket-plates joined and secured in position to the adjacent sides of the surfaces of said posts. Fig. 9 is a front elevation of the central portion of the upper and lower joined bracket-plates comprehended between the points $x$ in Fig. 8. Fig. 9$^a$ is a vertical sectional elevation of said bracket-plates, taken through the point $y$ or through the vertical center lines of the pipe-orifices as they appear when viewed from the left in Fig. 9; and Fig. 9$^b$ is an elevation of the joint-surfaces indicated by the point $z$ in Fig. 9 as they appear when viewed from the right.

In the drawings, A designates the specially-constructed before-mentioned supporting-frame of the invention, comprising right and left hand supporting-posts A$'$, with tube-supporting bracket-plates A$^2$, having their extremities rigidly secured to the inner surfaces of said posts, right and left hand vertically-disposed manifold tubes B with horizontally-disposed manifold tubes B$'$, having their forward ends tubularly connected with said vertically-disposed tubes B, and live and exhaust steam inducting tubes B$^2$, having their extremities secured to the upper ends of said vertically-disposed manifold tubes B, with horizontally-disposed steam-heating pipes or tubes C extending crosswise of the frame at the front end and throughout the entire length thereof with their rearward ends provided with means for receiving the condensed steam and for conducting said condensed steam therefrom.

The supporting-posts A$'$ are preferably made of cast-iron, arranged in oppositely-disposed pairs in two parallel lines, with approved spaces or intervals between them, said posts having the required dimensions, and are formed at their lower ends with rectangular plates $a$, on which to stand and through which to be secured in place in any approved manner. On their vertical outer surfaces are formed strengthening-ribs $a'$, with their inner surfaces remaining plain to have seated thereagainst the end flanges $a^2$ of bracket-plates $A^2$ and secured in place by headed bolts $a^3$ with nuts thereon. Said bracket-plates, made of approved sheet metal, have at their centers side flanges $a^4$, through which headed bolts $a^5$ with nuts thereon serve to secure said plates together. Centrally through said flanges $a^4$ are formed oval orifices $a^6$ for the purpose of reducing weight, and on the sides of said oval orifices are formed oblong apertures $a^7$, surrounded by strengthening-ribs $a^8$, having formed in the lower edges of said apertures semicircular recesses $a^9$ for supporting the heating tubes or pipes yet to be described.

The vertically-disposed manifold tubes B have their lower ends rigidly secured into the upper ends of specially-formed blocks constituting feet on which to stand, with their bases $b$ rigidly secured in place in any approved manner. Said tubes B, being of the required dimensions, have their rearward surfaces on the vertical center lines thereof formed with the required number of bosses $b'$, having in their centers orifices into which are firmly secured the forward ends of tubes $b^2$, with their rearward ends firmly secured into the adjacent heads of the horizontally-disposed tubular manifolds B', constituting the tubular connection therebetween and before mentioned, which manifolds B' have their rearward ends closed by flanged heads or caps $b^3$, and on the horizontal center lines in the adjacent inner surfaces thereof are formed the required number of bosses $b^4$, provided with central orifices for receiving the ends of the steam-heating pipes C before mentioned and yet to be described. Said vertically-disposed manifolds B have at their upper ends ring-flanges $b^5$, on which are seated and rigidly secured, as by bolts and nuts $b^6$, ring-flanges at the lower ends of elbows $b^7$, secured to the extremities of the live and exhaust steam inducting tubes $B^2$ before mentioned, said exhaust-steam-inducting tube having its center provided with an elbow $B^3$ for the purpose of receiving exhaust-steam, as from an engine. (Not shown.) On each side of the elbow, at the required distance therefrom, said tube is provided with a valve $B^4$, whereby the exhaust-steam may be admitted into each half of the heating-pipes C of the drier, or it may be entirely shut off. When it is desired to use live steam, as from a boiler, (not here shown,) said tube adjacent to the extremities thereof is provided with a tubular connection $B^5$, being centrally provided with an elbow $B^6$ for the purpose of receiving live steam from the before-mentioned boiler, and said latter tube adjacent to the extremities thereof is provided with valves $B^7$ for the purpose of controlling said live steam, admitting it into each half of the heating-pipes C of the drier, or it may be completely shut off therefrom.

The series of pipes or tubes C constitute the horizontal layers or shelves of the drier. Each pipe or tube comprises two branches $c$ and $c'$. Said branches $c$ have their near ends rigidly secured into respective orifices of the adjacent one of the horizontal manifolds B'. Thence they extend horizontally across the frame the required distance toward the opposite one of said manifolds B', where said ends are provided with elbows $c^2$, with the adjacent wings rigidly secured to said ends and the other wings thereof rearwardly extended, into which latter wings are rigidly secured the forward ends of the branches $c'$, which branches extend rearwardly through the oblong apertures $a^7$ and have their bodies engaging in the respective recesses $a^9$ of the bracket-plates $A^2$, to be supported thereby, and having their rearward ends extending the required distance beyond the rear end bracket-plate $A^2$ of the frame, where the extremities of said latter ends are rigidly secured into orifices formed in the adjacent sides of horizontal manifolds C'. Said latter manifolds are centrally provided on the rearward sides thereof with downwardly and rearwardly sloping tubes $c^3$ of the required dimensions, having rigidly secured thereto the adjacent wings of elbows $c^4$, with the openings of their free wings projected toward the center of the frame, into which openings are rigidly secured the adjacent ends of tubes $c^5$, having their other ends rigidly secured into orifices in the opposite sides of a vertically-disposed manifold $C^2$ of the required dimensions and arranged at the center of the frame A, said latter manifold having its upper end closed, as by a screw-cap $C^3$, and its lower end provided with a ring-flange $c^6$, to which is secured, by means of bolts and nuts $C^4$, the ring-flange of an outlet nozzle or tube $C^5$ of the required dimensions, which nozzle is adapted to conduct away from the drier the product of condensation of the steam collected from the drier through the manifolds C' and their tubular connections with the manifold $C^2$.

It will here be observed that the metal posts A', as described, with the metal bracket-plates $A^2$, also as described, in having their centers joined, as shown, and the extremities of their outer ends rigidly secured to the adjacent inner vertical surfaces of said posts, constitute the metallic supporting-frame A, forming the distinctive feature of the present invention, and with the vertical manifolds B, the horizontal manifolds B' and their tubular connections $b^2$, the live and exhaust steam inducting tubes $B^2$, the L-shaped steam-drying pipes or tubes C, having the branches $c$ and $c'$ and the elbows $c^2$ joining their adjacent ends, the rear end horizontal manifolds C', the downwardly and rearwardly sloping tubes $c^3$, the horizontal centrally-disposed tubes $c^5$, the vertically-disposed manifold tube $C^2$, with the covering-cap $C^3$, the lower end ring-flange $c^6$, the outlet-nozzle $C^5$, and their several tubular connections, all arranged, combined, and secured in position as shown and described, completing the drier, forming one body, adapted to move lengthwise rearward or forward, compensating for the expansion or contraction resulting from the steam in said drying-pipes C and its condensation therein. It will also be observed that steam-drying pipes similar to the pipes C, above mentioned, have been used heretofore in the construction of driers of this class. No claims are therefore made broadly thereto; but What is considered new, and desired to be secured by Letters Patent, is—

1. In a drier, in combination, the supporting-frame A composed of the metallic posts A' having the base-plates $a$ and the vertical strengthening-ribs $a'$ with the plain vertical inner surfaces, and the bracket-plates $A^2$ having at the extremities of their centers the side flanges $a^4$ with the headed bolts and nuts $a^5$ securing them together, and at the extremities of their outer ends the flanges $a^2$ in engagement with said plain surfaces and the headed bolts $a^3$ therethrough with nuts on their outer ends to secure them together, said plates having at their centers the oval orifices $a^6$ and in their bodies on the sides of said orifices the oblong apertures $a^7$, said apertures surrounded by the strengthening-ribs $a^8$ with the semicircular recesses $a^9$ in their lower edges, all substantially as described and for the purpose hereinbefore set forth.

2. The combination in a drier of the character described with the metallic supporting-frame A having the metallic posts A' with the bracket-plates $A^2$ as described having their outer ends rigidly secured to the adjacent inner vertical surfaces of said posts, of the vertically-disposed right and left end manifolds B, with the horizontal tubular manifolds B' having their forward ends tubularly connected with the rearward sides of said manifolds B, and the live and exhaust steam induction tubes $B^2$ joined to the upper ends of said first-mentioned manifolds B, with the L-shaped tubes C having the branches $c$ and $c'$ provided for the purpose of distributing heat throughout the length and breadth of said frame A of said drier, all substantially as described and for the purpose hereinbefore set forth.

3. The combination in a drier of the character described with the metallic supporting-frame A having the end posts A', as described, and the metallic bracket-plates $A^2$, as described, having the extremities of their outer ends rigidly secured to the adjacent inner vertical surfaces of said posts, with the vertically-disposed manifolds B and the horizontally-disposed manifolds B' having their forward ends tubularly connected through the rearward sides of the tubular manifolds B, and the L-shaped steam-heating pipes C having the branches $c$ and $c'$, and the elbows $c^2$ joining the adjacent extremities of said branches, said branches $c$ having their outer ends rigidly secured into the adjacent sides of said horizontal manifolds B', and the branches $c'$ passing rearward through the oblong apertures $a^7$ of the bracket-plates $A^2$ with their bodies in engagement with the semicircular recesses $a^9$ in the lower edges of said apertures and the rearward extremities of said branches $c'$ projecting the required distance beyond the rearward one of said bracket-plates $A^2$, of the horizontally-disposed manifolds C' with their forward sides rigidly secured to the rearward extremities of said branches $c'$, and the downwardly and rearwardly sloping tubes $c^3$ with their forward ends rigidly secured into the centers of said manifolds C' and having at their lower ends the elbows $c^4$, with their open ends disposed toward the center of the frame, and the central vertically-disposed manifold $C^2$ with the horizontal tubes $c^5$ having their outer ends secured into said elbows $c^4$ and their adjacent inner ends rigidly secured into the opposite sides of said last-mentioned manifold, the covering-cap $C^3$ closing the upper end of said manifold $C^2$ with the outlet-nozzle $C^5$ secured to the lower end thereof, all substantially as described and for the purpose hereinbefore set forth.

In testimony whereof I affix my signature in presence of two subscribing witnesses.

WILLIAM RICHARD MARTIN.

Witnesses:
 CHAS. E. LONG,
 MABEL L. LEFEVRE.